United States Patent
Fukuhara

(10) Patent No.: US 12,521,797 B2
(45) Date of Patent: Jan. 13, 2026

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Yousuke Fukuhara, Otsu (JP)

(73) Assignee: KYOCERA CORPORATION, Kyoto (JP)

( * ) Notice: Subject to any disclaimer, the term of this patent is extended or adjusted under 35 U.S.C. 154(b) by 568 days.

(21) Appl. No.: 17/999,213

(22) PCT Filed: May 11, 2021

(86) PCT No.: PCT/JP2021/017803
§ 371 (c)(1),
(2) Date: Nov. 18, 2022

(87) PCT Pub. No.: WO2021/235261
PCT Pub. Date: Nov. 25, 2021

(65) Prior Publication Data
US 2023/0234143 A1    Jul. 27, 2023

(30) Foreign Application Priority Data

May 21, 2020  (JP) .................................. 2020-089046

(51) Int. Cl.
*B23B 27/16*    (2006.01)
(52) U.S. Cl.
CPC .............................. *B23B 27/1611* (2013.01)
(58) Field of Classification Search
CPC ... B23B 2210/022; B23B 27/04; B23B 27/08; B23B 27/1611; B23B 27/1603; B23B 27/1614; B23B 27/1622; B23B 27/164; B23B 27/1651; B23B 27/1659; B23B 27/1662; B23B 2200/085; B23B 2200/121; B23B 2200/204; B23B 2200/202; B23B 2200/20; B23B 2200/286; B23C 3/28; B23C 3/30; B23C 2220/36; B23C 2200/286; B23C 2200/287; B23C 2200/291

See application file for complete search history.

(56) References Cited

U.S. PATENT DOCUMENTS

| | | | |
|---|---|---|---|
| 5,137,396 A * | 8/1992 | Durschinger | ......... B23B 27/045 407/116 |
| 6,217,263 B1 | 4/2001 | Wiman et al. | |
| 6,238,147 B1 | 5/2001 | Tagtstrom et al. | |

(Continued)

FOREIGN PATENT DOCUMENTS

| | | | | |
|---|---|---|---|---|
| EP | 3417964 A1 * | 12/2018 | ............. | B23B 27/04 |
| JP | H8507976 A | 8/1996 | | |

(Continued)

*Primary Examiner* — Nicole N Ramos
(74) *Attorney, Agent, or Firm* — HAUPTMAN HAM, LLP

(57) ABSTRACT

A cutting insert according to an aspect includes a base portion and a cutting portion. The cutting portion includes a front end surface, an top surface, a first lateral surface, a second lateral surface, a front cutting edge, and a lateral cutting edge. The front cutting edge includes a first cutting edge and a second cutting edge, and a radius of curvature of the first cutting edge is greater than a radius of curvature of the second cutting edge.

11 Claims, 16 Drawing Sheets

(56) References Cited

U.S. PATENT DOCUMENTS

| | | | |
|---|---|---|---|
| 2004/0146365 A1 | 7/2004 | Usui et al. | |
| 2005/0254908 A1* | 11/2005 | Norstrom | B23B 27/145 |
| | | | 407/113 |
| 2017/0066060 A1* | 3/2017 | Tsuda | B23B 27/141 |
| 2019/0061016 A1* | 2/2019 | Sagara | B23B 27/045 |

FOREIGN PATENT DOCUMENTS

| | | | | |
|---|---|---|---|---|
| JP | 2002516185 A | 6/2002 | | |
| JP | 2004237438 A | 8/2004 | | |
| JP | 4121449 B2 * | 7/2008 | | B23B 27/145 |
| JP | 2012250296 A | 12/2012 | | |
| JP | 6717941 B2 * | 7/2020 | | B23C 5/109 |
| SE | 509224 C2 * | 12/1998 | | B23B 27/141 |
| WO | 9500272 A1 | 1/1995 | | |
| WO | WO-2018084110 A1 * | 5/2018 | | B23B 27/22 |
| WO | 2018233861 A1 | 12/2018 | | |

* cited by examiner

CUTTING INSERT, CUTTING TOOL, AND METHOD FOR MANUFACTURING MACHINED PRODUCT

RELATED APPLICATIONS

The present application is a National Phase of International Application Number PCT/JP2021/017803 filed May 11, 2021, which claims the benefit of priority from Japanese Patent Application No. 2020-089046, filed on May 21, 2020.

TECHNICAL FIELD

The present disclosure relates to a cutting insert, a cutting tool, and a method for manufacturing a machined product.

BACKGROUND OF INVENTION

As a cutting insert used when turning processing a workpiece made of metal or the like, a throw away tip disclosed in Patent Document 1 is known, for example. The tip described in Patent Document 1 can be used for post-grinding. The tip includes a body portion and a cutting portion. The cutting portion includes a wiper blade positioned at a front end thereof and having an arc shape, a first cutting edge extending from the wiper blade and having a linear shape, and a second cutting edge extending from the first cutting edge and having a linear shape. The wiper blade has a function of reducing the surface roughness of a machining surface of the workpiece.

CITATION LIST

Patent Literature

Patent Document 1: JP 2012-250296 A

SUMMARY

A cutting insert according to an aspect of the present disclosure includes a base portion and a cutting portion provided to project from the base portion, wherein the cutting portion includes a front end surface positioned closer to a side of a front end in a direction projecting from the base portion, an top surface extending from the base portion to the front end surface, a first lateral surface extending from the base portion to the front end surface and adjacent to the top surface, a second lateral surface extending from the base portion to the front end surface and adjacent to the top surface on the opposite side of the first lateral surface, a front cutting edge positioned at an intersection of the top surface and the front end surface, and a lateral cutting edge positioned at an intersection of the top surface and the first lateral surface. The front cutting edge includes a first cutting edge including an end portion closer to the side of the front end of the front cutting edge and a second cutting edge positioned between the first cutting edge and the lateral cutting edge, and a radius of curvature of the first cutting edge is greater than a radius of curvature of the second cutting edge.

DESCRIPTION OF EMBODIMENTS

Figure 1:
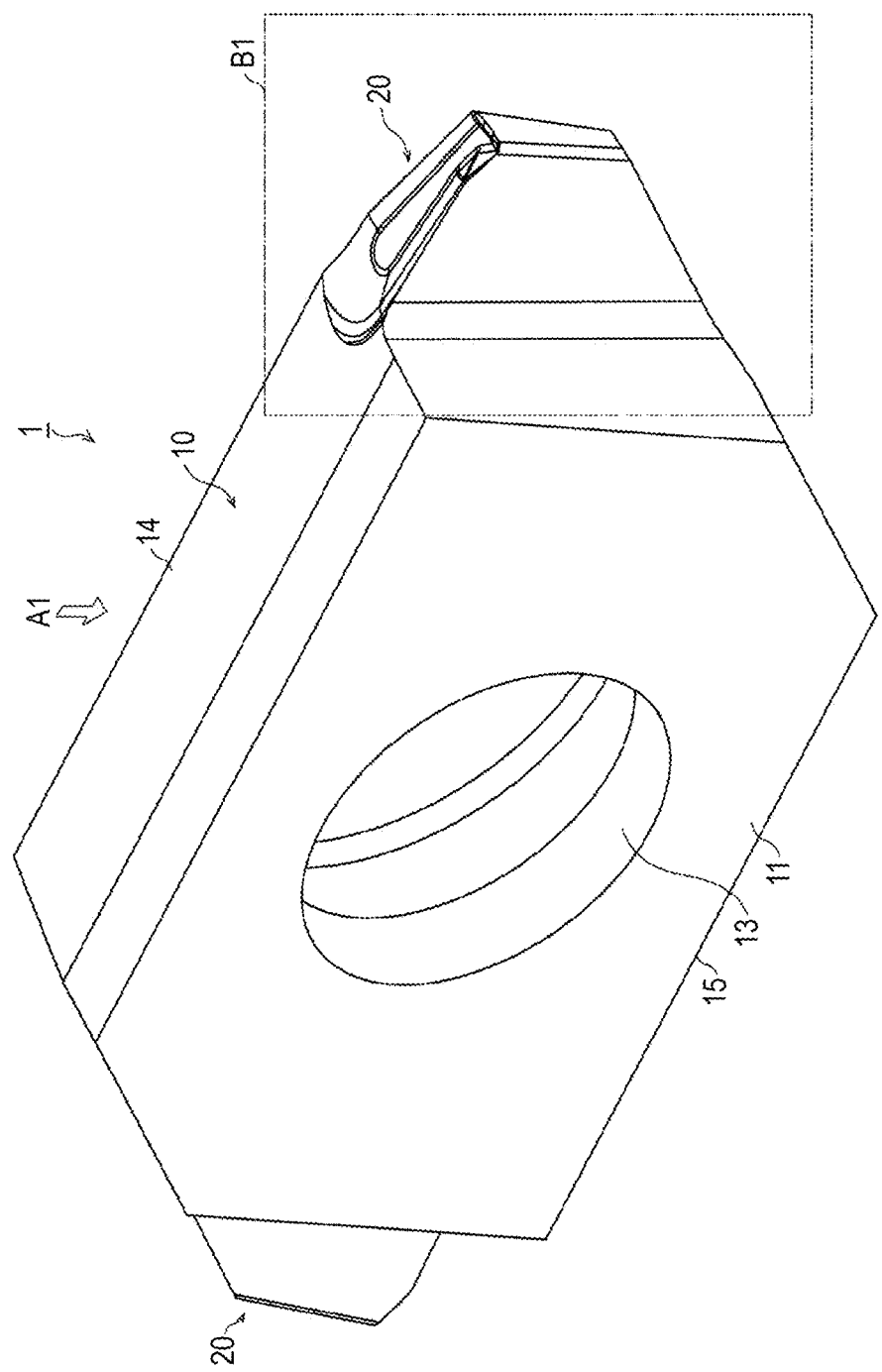
FIG. 1 is a perspective view of a cutting insert according to an embodiment of the present disclosure.

Detailed description will be given below of a cutting insert (hereinafter, also simply referred to as an insert), a cutting tool and a method for manufacturing a machined product of one embodiment of the present invention with reference to the diagrams. However, each of the figures referred to below is a simplified representation of only main members necessary for description of the embodiments. Thus, the insert and the cutting tool may include any constituent member not illustrated in each of the figures referenced. Further, the dimensions of the members in the drawings do not faithfully represent the actual dimensions of the constituent members, the dimension ratios of the members, or the like.

The insert in the present embodiment can be used, for example, in turning processing. Examples of the turning processing include outer diameter processing, boring, groove-forming, cutting-off processing, and post-grinding.

1. Overview of Insert

Figure 2:
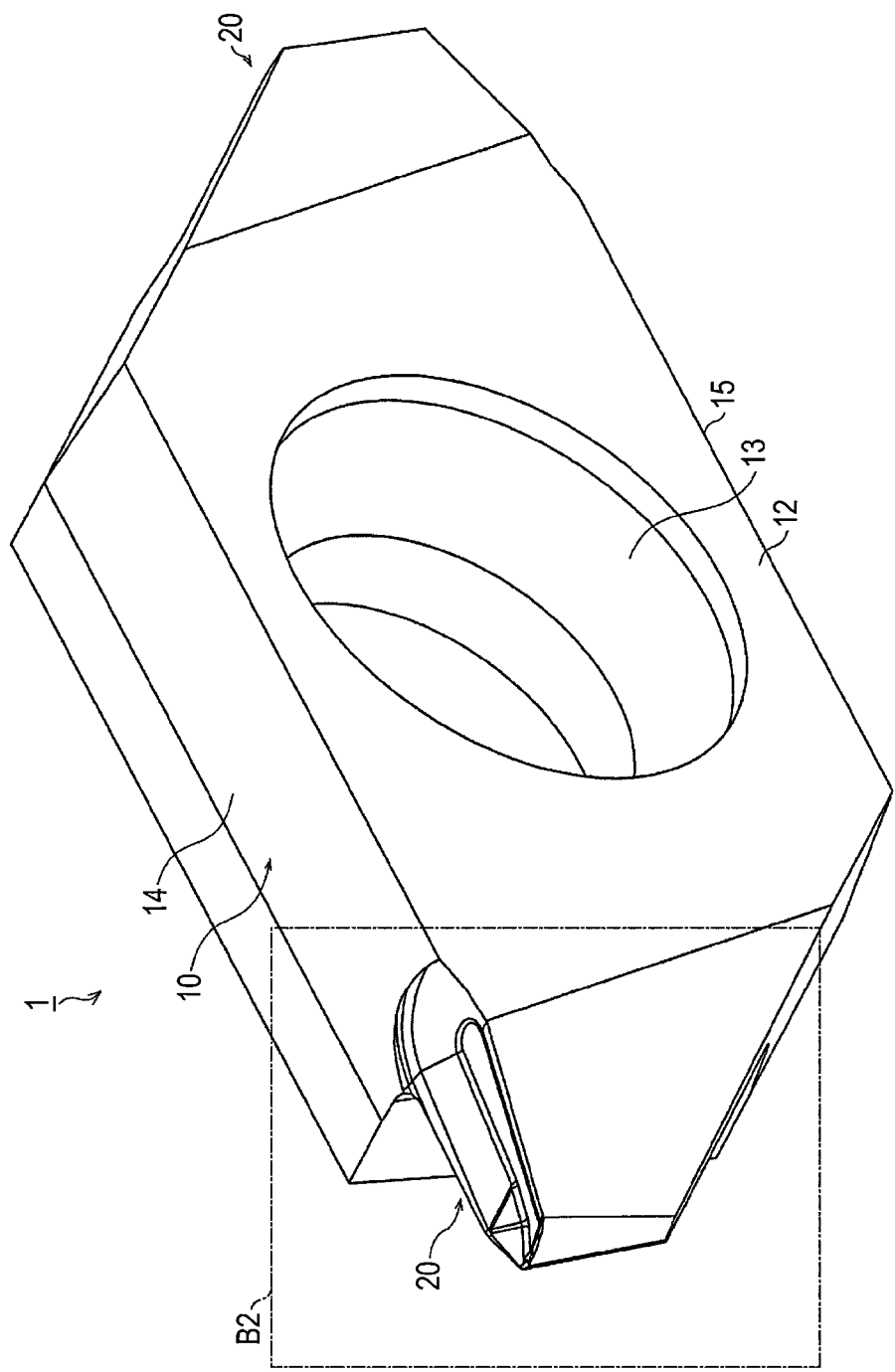
FIG. 2 is a perspective view of the cutting insert illustrated in FIG. 1 as viewed from a different direction.
Figure 3:
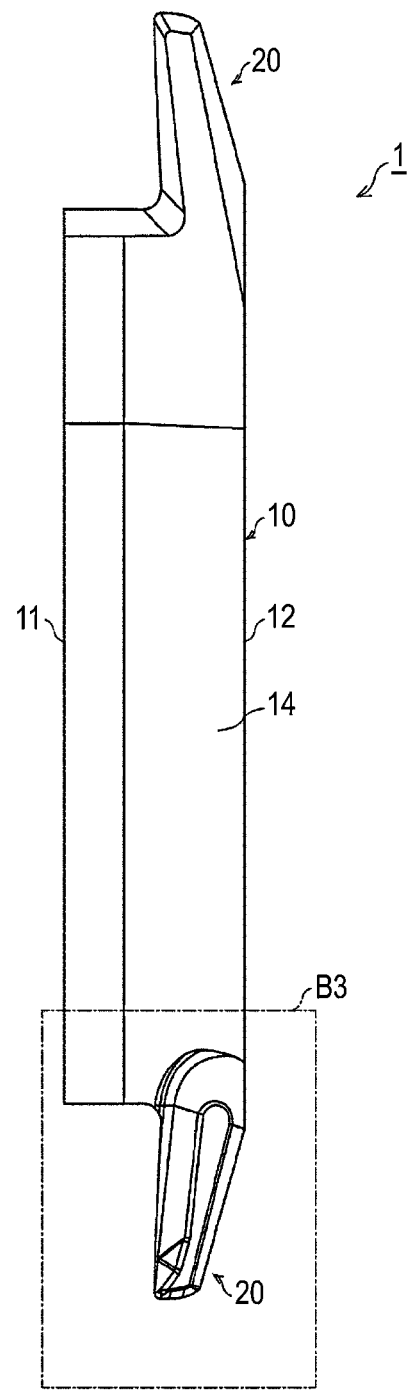
FIG. 3 is a top view of the cutting insert illustrated in FIG. 1 as viewed from an A1 direction illustrated in FIG. 1.

First, an overview of an insert 1 of an embodiment of the disclosure will be described while referencing FIGS. 1 to 3. FIG. 1 is a perspective view of the insert 1. FIG. 2 is a perspective view of the insert 1 as viewed from a different direction. FIG. 3 is a top view of the insert 1 as viewed from an A1 direction illustrated in FIG. 1.

As illustrated in FIGS. 1 to 3, the insert 1 includes a base portion 10 and a cutting portion 20 provided so as to project from the base portion 10. The base portion 10 can be used as a portion that is constrained by a holder 105 when the insert 1 is attached to the holder 105 (see FIGS. 11 and 12) described below. The cutting portion 20 is a portion that comes into contact with a workpiece 201 (see FIGS. 13 to 16) in machining described below and is a portion that plays a main role in the machining. In the present example, the insert 1 includes two cutting portions 20, but may include three or more cutting portions 20, and may include only one cutting portion 20.

The shape of the base portion 10 is not limited to a specific configuration. For example, the shape of the base portion 10 may include a configuration of, for example, a bar shape, a polygonal plate shape, or a polygonal column shape. In the present example, as illustrated in FIGS. 1 to 3, when viewed from a direction facing a relatively large plate surface (first main surface 11), the base portion 10 has a hexagonal plate shape in which two opposing corners of a rectangle are cut off. The base portion 10 includes a first main surface 11 (see FIG. 1) that is of a hexagon, a second main surface 12 (see FIG. 2) that is also of a hexagon and positioned on the opposite side of the first main surface 11, and a through hole 13 that opens at the center of the first main surface 11 and at the center of the second main surface 12. The through hole 13 may be used to fix the insert 1 to a holder 105 (see FIGS. 11 and 12) described below. For example, in case where the insert 1 is attached to the holder 105, the insert 1 can be fixed to the holder 105 by inserting a screw 107 into the through hole 13.

In the present example, the base portion 10 includes a top side surface 14 and a bottom side surface 15. The top side surface 14 and the bottom side surface 15 are each flat surfaces and are positioned parallel to each other along the longitudinal direction of the insert 1. As illustrated in FIGS. 1 and 2, the top side surface 14 and the bottom side surface 15 may form a part of the side surface portion positioned between the first main surface 11 and the second main surface 12 of the base portion 10.

Note that, in the present specification, the description of "flat" or "flat surface" intends to mean that the surface is not a curved surface at a visible level or does not have unevenness at a visible level, and is not required to be strictly flat. Thus, an unavoidable degree of unevenness may be allowed in the manufacture of insert 1. Specifically, unevenness with a surface roughness of about 50 μm may be allowed.

The size of the base portion 10 is not particularly limited. The maximum width of the base portion 10 in a direction from the first main surface 11 to the second main surface 12 and orthogonal to the longitudinal direction of the insert 1 may be, for example, set to from about 2.9 mm to about 4.1 mm. The dimension of the base portion 10 in the longitudinal direction may be set to from about 8 mm to about 20 mm.

The shapes of the two cutting portions 20 are not limited to a specific configuration. The cutting portions 20 may have a configuration of, for example, a bar shape, a polygonal plate shape, or a polygonal column shape. The shape of each of the two cutting portions 20 in the present example is a triangular plate shape. The base portion 10 and the cutting portions 20 of the insert 1 may be formed separately or integrally.

The width of each cutting portion 20 in a direction from the first main surface 11 to the second main surface 12 and orthogonal to the longitudinal direction of the insert 1 may be smaller than the width of the base portion 10 in the same direction. If the width of the base portion 10 is relatively large, since the thickness of the base portion 10 is ensured, the insert 1 can be fixed stably to the holder 105 (see FIGS. 11 and 12). If the width of each cutting portion 20 is relatively small, a degree of freedom of a cutting width in the machining of the workpiece 201 can be increased. Note that if the widths of the base portion 10 and each cutting portion 20 are different as described above, regions of the base portion 10 and the cutting portion 20 of the insert 1 may be divided by the portions having the different widths.

In the present example, the two cutting portions 20 project outward from the base portion 10 respectively. One cutting portion 20 of the two cutting portions 20 projects outward along a longitudinal direction from one end portion in the longitudinal direction of the base portion 10. The other cutting portion 20 of the two cutting portions 20 projects along a longitudinal direction from the other end portion in the longitudinal direction of the base portion 10. The two cutting portions 20 project toward opposite sides of each other.

In case of the insert 1, the two cutting portions 20 may be positioned to be rotationally symmetrical with respect to a center axis of the through hole 13. In the present example, the two cutting portions 20 project toward opposite sides of each other and are positioned to be rotationally symmetrical with respect to the center axis of the through hole 13, and have substantially the same configuration. Therefore, the configuration of the cutting portion 20 projecting rightward when the insert 1 is viewed from the first main surface 11 side of the base portion 10 in FIG. 1 among the two cutting portions 20 will be described in detail below, and description of the other cutting portion 20 projecting leftward will be omitted.

2. Detail of Cutting Portion

Figure 4:
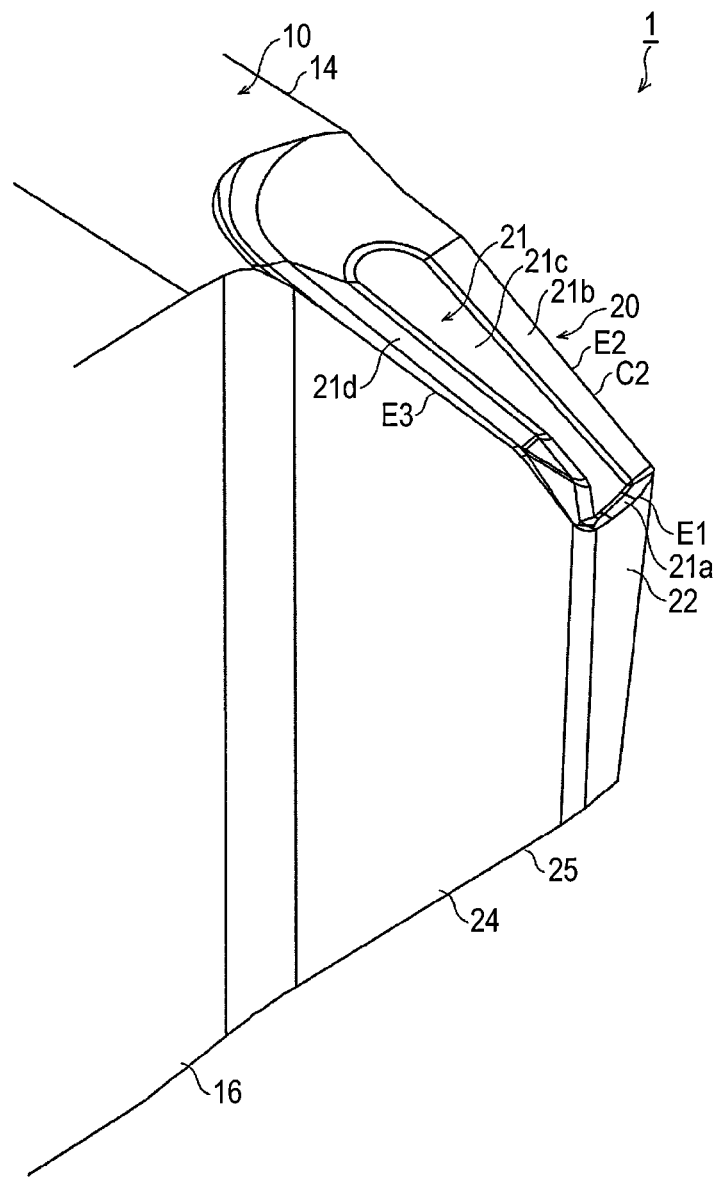
FIG. 4 is an enlarged view of a region B1 illustrated in FIG. 1.
Figure 5:
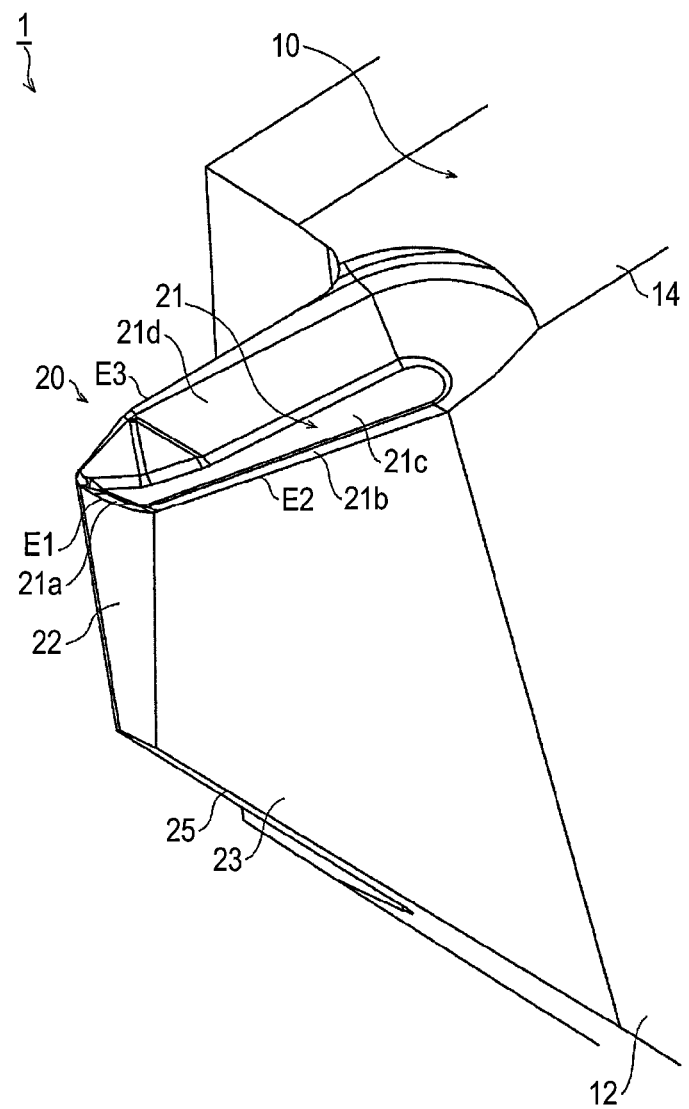
FIG. 5 is an enlarged view of a region B2 illustrated in FIG. 2.

Details of the cutting portion 20 will be described using FIGS. 4 to 6. FIG. 4 is an enlarged view of a region B1 illustrated in FIG. 1. FIG. 5 is an enlarged view of a region B2 illustrated in FIG. 2.

As illustrated in FIGS. 4 and 5, in the present example, the cutting portion 20 includes an top surface 21, a front end surface 22, a first lateral surface 23, a second lateral surface 24, and a lower surface 25. The front end surface 22 is positioned closer to the side of the front end, which is a direction in which the cutting portion 20 projects from the base portion 10.

The top surface 21 extends from the base portion 10 (the top side surface 14 of the base portion 10) to the front end surface 22, and is adjacent to the front end surface 22. Note that, in the other cutting portion 20, the top surface 21 extends from the bottom side surface 15 of the base portion 10 to the front end surface 22.

The first lateral surface 23 extends from the base portion 10 to the front end surface 22. More specifically, the first lateral surface 23 extends from the second main surface 12 of the base portion 10 to the front end surface 22. Also in the other cutting portion 20, the first lateral surface 23 extends from the second main surface 12 of the base portion 10 to the front end surface 22. The first lateral surface 23 is adjacent to the top surface 21 and is also adjacent to the front end surface 22.

The second lateral surface 24 extends from the base portion 10 to the front end surface 22. More specifically, the second lateral surface 24 extends from a stepped surface 16 adjacent to the first main surface 11 of the base portion 10 to the front end surface 22. The stepped surface 16 is a flat surface extending from the first main surface 11 toward the second main surface 12. The stepped surface 16 is a surface generated when the width of the cutting portion 20 in a direction from the first main surface 11 toward the second main surface 12 is smaller than the width of the base portion 10 in the same direction. Also, in the other cutting portion 20, the second lateral surface 24 is adjacent to the first main surface 11 of the base portion 10, and extends to the front end surface 22 from a stepped surface forming a flat surface in a direction from the first main surface 11 toward the second main surface 12. The second lateral surface 24 is adjacent to the top surface 21 on the opposite side of the first lateral surface 23. The second lateral surface 24 is also adjacent to the front end surface 22 on the opposite side of the first lateral surface 23.

The lower surface 25 extends from the bottom side surface 15 of the base portion 10 to the front end surface 22. In the other cutting portion 20, the lower surface 25 extends from the top side surface 14 of the base portion 10 to the front end surface 22. The lower surface 25 is adjacent to the top surface 21 via the first lateral surface 23, the front end surface 22, and the second lateral surface 24.

As illustrated in FIGS. 4 and 5, in the present example, the first lateral surface 23 has a substantially planar shape. Although described in detail later, the front end surface 22 may have a gradual curved shape, or may have a substantially planar shape. The front end surface 22 and the first lateral surface 23 may be directly connected, or connected via a curved surface between the front end surface 22 and the first lateral surface 23. The second lateral surface 24 also has a substantially planar shape. The first lateral surface 23 and the second lateral surface 24 may have a curved shape.

A ridge line is formed at an intersection of the surfaces, such as the top surface 21, the front end surface 22, the first lateral surface 23, and the second lateral surface 24. Among them, a ridge line where the top surface 21 and the front end surface 22 intersect is defined as a first ridge line E1, a ridge line where the top surface 21 and the first lateral surface 23 intersect is defined as a second ridge line E2, and a ridge line where the top surface 21 and the second lateral surface 24 intersect is defined as a third ridge line E3. That is, the cutting portion 20 includes the first ridge line E1, the second ridge line E2, and the third ridge line E3. Cutting edges for machining can be formed on the ridge lines, and are positioned on the ridge lines.

In the present example, the cutting portion 20 includes a front cutting edge F on the first ridge line E1, and includes a lateral cutting edge S on the second ridge line E2. In contrast, the third ridge line E3 does not include the cutting edge. Here, the third ridge line E3 is a ridge line in which a surface of a breaker protrusion 21d formed on the top surface 21 and the second lateral surface 24 intersect.

The front cutting edge F can be used as a cutting edge that mainly functions in, for example, groove-forming and cutting-off processing. The lateral cutting edge S may be used as a cutting edge that assists the machining by the front cutting edge F. The lateral cutting edge S can be used as a cutting edge that mainly functions in, for example, post-grinding (lateral feed processing). The front cutting edge F may be used as a cutting edge, specifically, a wiper edge (flat cutting edge). that assists the machining by the lateral cutting edge S.

Here, the cutting portion 20 in the present example includes a plurality of cutting edges as the front cutting edge F, and a plurality of inclined surfaces each corresponding to a respective one of the plurality of cutting edges are formed on the top surface 21. The plurality of cutting edges and the plurality of inclined surfaces will be described below with reference to FIGS. 6 and 8 to 10. FIG. 6 is an enlarged view of a region B3 illustrated in FIG. 3 and an enlarged view of a front end portion of the cutting portion. FIG. 6 illustrates each of the plurality of inclined surfaces with different hatching.

Figure 6:
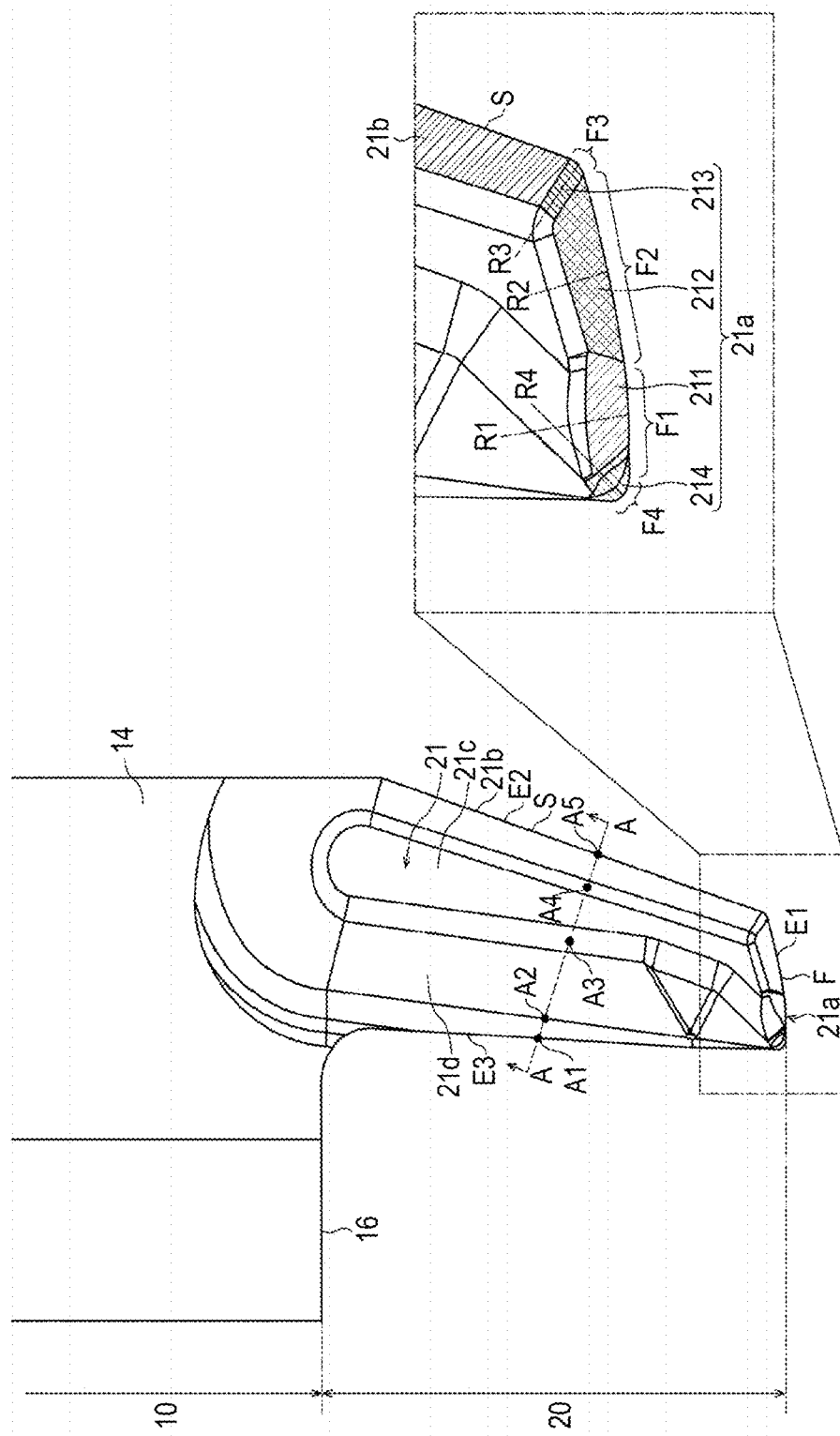
FIG. 6 is an enlarged view of a region B3 illustrated in FIG. 3 and an enlarged view of a front end portion of a cutting portion.

As illustrated in FIG. 6, the cutting portion 20 of the insert 1 of the present example includes, as the front cutting edge F, a first cutting edge F1 and a second cutting edge F2. The first cutting edge F1 is formed in the front cutting edge F at a position including an end portion closer to the side of the front end in a direction in which the cutting portion 20 projects from the base portion 10. The second cutting edge F2 is located between the first cutting edge F1 and the lateral cutting edge S.

Both the first cutting edge F1 and the second cutting edge F2 have a curved shape, and a radius of curvature R1 of the first cutting edge F1 is larger than a radius of curvature R2 of the second cutting edge F2.

The above configuration makes it easier to avoid excessive thinning of the thickness of a chip. Therefore, tearing is less likely to occur on the machining surface of the workpiece. As a result, the surface roughness of the machining surface can be further reduced. The reason for this will be described with reference to FIG. 7.

Figure 7:
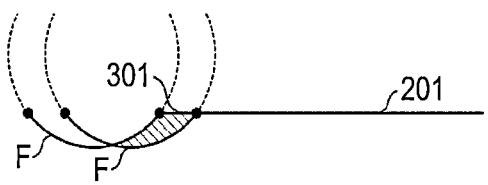
FIG. 7 is a schematic view illustrating shapes of chips during machining
Figure 7:
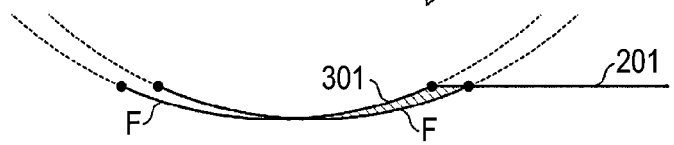
Figure 7:
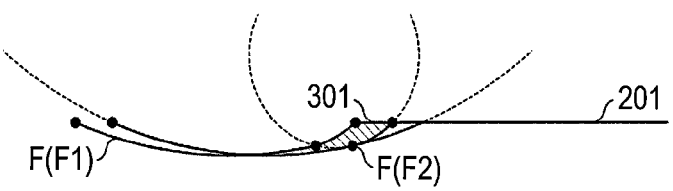

FIG. 7 is a schematic view illustrating shapes of chips generated at the front cutting edge F during machining. In FIG. 7, the chip 301 is hatched. Note that the drawings indicated by reference signs 7001 and 7002 in FIG. 7 illustrate the shapes of the chips in a case where inserts according to reference examples are used. The drawing indicated by reference sign 7003 in FIG. 7 illustrate the shape of a chip in a case where the insert 1 according to an embodiment of the present disclosure is used. FIG. 7 illustrates a state in which the front cutting edge F is used to cut the surface of the workpiece 201 (see FIGS. 13 to 16), and in each of the drawings indicated by reference signs 7001 to 7003, a feed amount and a cutting depth of the insert are set to the same conditions.

When the radius of curvature R1 and the radius of curvature R2 have the same value and a relatively small value, as indicated by the reference sign 7001 in FIG. 7, the thickness of the chip 301 is thicker, and thus tearing is less likely to occur on the machining surface during the machining. However, since the radius of curvature R1 and the radius of curvature R2 have relatively small values, the unevenness caused by the curved shape of the first cutting edge F1 and the second cutting edge F2 is large, and thus the surface roughness of the machining surface likely increases.

When the radius of curvature R1 and the radius of curvature R2 have the same value and a relatively large value, as indicated by the reference sign 7002 in FIG. 7, the first cutting edge F1 and the second cutting edge F2 have a gradual curved shape, and thus the unevenness caused by the curved shape of the first cutting edge F1 and the second cutting edge F2 is small. However, since the thickness of the chip 301 is thinner, tearing is likely to occur on the machining surface during the machining.

On the other hand, when the radius of curvature R1 is larger than the radius of curvature R2, as indicated by the reference sign 7003 in FIG. 7, the surface roughness of the machining surface can be reduced. Specifically, since the radius of curvature R1 is relatively large, the unevenness caused by the curved shape of the first cutting edge F1 and the second cutting edge F2 is small. Since the radius of curvature R2 is relatively small, the thickness of the chip 301 is thick, and tearing is less likely to occur on the machining surface during the machining. As a result, the surface roughness of the machining surface can be reduced.

Note that the second cutting edge F2 may be longer than the first cutting edge F1. In other words, the value of a length of a line segment of the second cutting edge F2 from one end portion to the other end portion may be greater than the value of a length of a line segment of the first cutting edge F1 from one end portion to the other end portion.

The above configuration can reduce a portion where the thickness of the chip is excessively thin. Therefore, tearing is less likely to occur on the machining surface of the workpiece. As a result, the surface roughness of the machining surface can be further reduced.

The cutting portion 20 in the present example further includes, as the front cutting edge F, a third cutting edge F3 positioned between the second cutting edge F2 and the lateral cutting edge S. As a result, as compared with a case where the second cutting edge F2 and the lateral cutting edge S intersect, the strength of the cutting edge near the boundary of the second cutting edge F2 and the lateral cutting edge S is increased. A radius of curvature R3 of the third cutting edge F3 may be smaller than the radius of curvature R2 of the second cutting edge F2. This makes it possible to increase the strength of the cutting edge as described above while ensuring the lengths of the second cutting edge F2 and the lateral cutting edge S.

The cutting portion 20 in the present example further includes, as the front cutting edge F, a fourth cutting edge F4 extending from the first cutting edge F1 toward the third ridge line E3. The radius of curvature R1 of the first cutting edge F1 may be larger than a radius of curvature R4 of the fourth cutting edge F4. As a result, the strength of the cutting edge at a portion where the first cutting edge F1 and the third ridge line E3 intersect can be increased, and can reduce the likelihood of chipping of the cutting edge. The surface roughness of a groove wall surface can be reduced during the groove processing.

The radius of curvature R2 of the second cutting edge F2 may be larger than the radius of curvature R4 of the fourth cutting edge F4. This makes it possible to increase the front cutting edge F. Thus, the strength of the front cutting edge F is high. During the groove processing, an uncut portion between the groove wall surface and the groove bottom surface can be reduced, and the machining accuracy during the groove processing can be enhanced.

Figure 8:
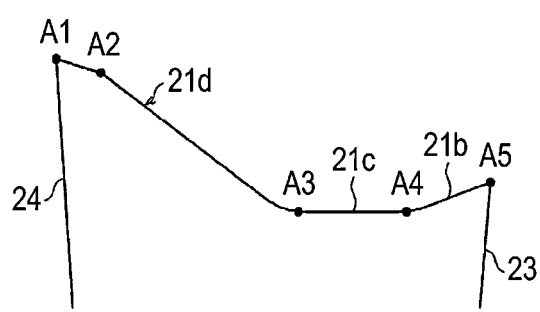
FIG. 8 is a cross-sectional view taken along an arrow line A-A of the cutting insert illustrated in FIG. 6.

FIG. 8 is a cross-sectional view taken along an arrow line A-A illustrated in FIG. 6. As illustrated in FIGS. 4 to 6 and 8, the top surface 21 has an uneven shape rather than a planar shape. Specifically, in the present example, the top surface 21 includes a front inclined surface 21a, a lateral inclined surface 21b, a bottom surface 21c being flat, and the breaker protrusion 21d.

The front inclined surface 21a formed on the top surface 21 is positioned so as to extend along the front cutting edge F (first ridge line E1), and is inclined downward as the front inclined surface 21a becomes further away from the front cutting edge F. The front inclined surface 21a includes a first inclined surface 211 positioned along the first cutting edge F1, and a second inclined surface 212 positioned along the second cutting edge F2. The front inclined surface 21a of the cutting portion 20 in the present example further includes a third inclined surface 213 positioned along the third cutting edge F3, and a fourth inclined surface 214 positioned along the fourth cutting edge F4.

The lateral inclined surface 21b extends along the lateral cutting edge S (second ridge line E2) and includes an inclination downward toward the bottom surface 21c.

The breaker protrusion 21d extends along the second lateral surface 24 and rises from the bottom surface 21c toward the second lateral surface 24. The intersection of the second lateral surface 24 and the surface of the breaker protrusion 21d is the third ridge line E3. The breaker protrusion 21d is a member having a function of guiding a feed direction of the chips generated by cutting the workpiece by the front cutting edge F or the lateral cutting edge S to a discharge direction and a function of dividing the chips. The chips are curled by bringing the chips into contact with the breaker protrusion 21d, and thus a chip discharge property can be improved.

In FIG. 8, a line connecting points A1, A2, and A3 is provided by the breaker protrusion 21d, and a line connecting points A3 and A4 is provided by the bottom surface 21c. A line connecting the points A4 and A5 is provided by the lateral inclined surface 21b. A rising surface of the breaker protrusion 21d and the bottom surface 21c may include a curved surface interposed therebetween, or may be directly connected to each other. The bottom surface 21c and the lateral inclined surface 21b may include a curved surface interposed therebetween, or may be directly connected to each other.

3. Shape of Front Inclined Surface 21a

Figure 9:
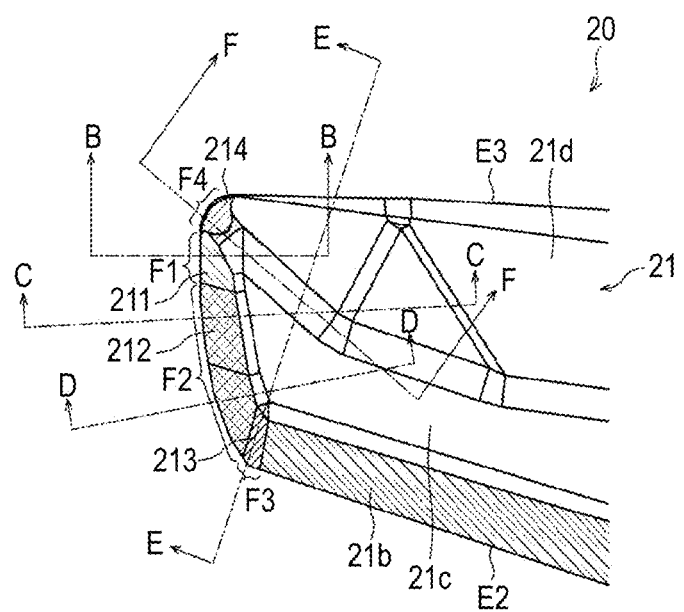
FIG. 9 is a view illustrating an enlarged view of the front end portion of the cutting portion illustrated in FIG. 6 rotated clockwise by 90°.
Figure 10:
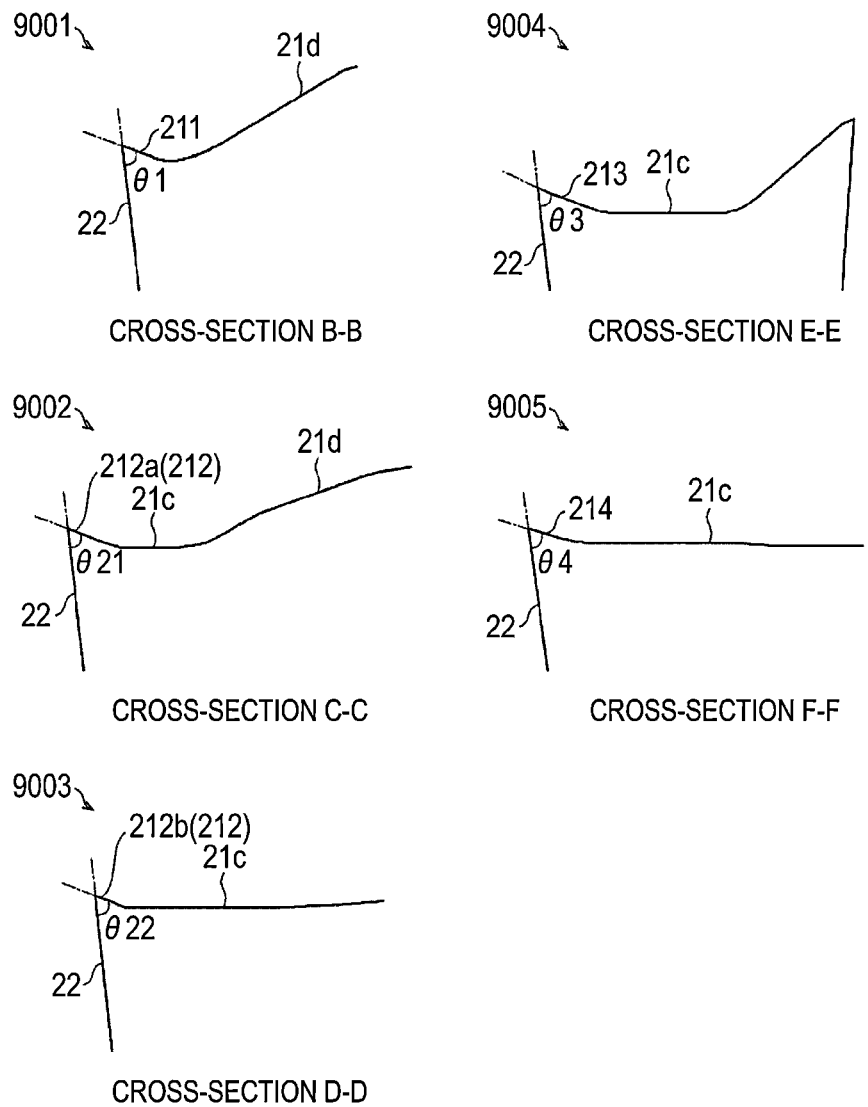
FIG. 10 includes cross-sectional views taken along arrow lines B-B to F-F of the cutting insert illustrated in FIG. 9.

The plurality of inclined surfaces (the first inclined surface 211 to the fourth inclined surface 214) each corresponding to a respective one of the plurality of cutting edges (the first cutting edge F1 to the fourth cutting edge F4) formed in the front end portion of the cutting portion 20 will be described below using FIGS. 9 and 10. FIG. 9 is an enlarged view of the front end portion of the cutting portion 20 illustrated in FIG. 6 rotated clockwise by 90°. FIG. 10 includes cross-sectional views taken along arrow lines B-B to F-F in FIG. 9.

As illustrated in FIG. 9, the description will be made based on the five cross sections (the B-B cross section to the F-F cross section) when the front end portion of the cutting portion 20 is cut in a flat surface parallel to a height direction of the cutting portion 20 and parallel to a direction orthogonal to the front end (first ridge line E1) of the cutting portion 20.

As indicated by a reference sign 9001 in FIG. 10, in a cross-sectional view including the first inclined surface 211, an angle formed by the first inclined surface 211 with respect to the front end surface 22 is referred to as a first inclination angle $\theta 1$.

As indicated by reference signs 9002 and 9003 in FIG. 10, in a cross-sectional view including the second inclined surface 212, an angle formed by the second inclined surface 212 with respect to the front end surface 22 will be described below. That is, the second inclined surface 212 includes a front side second inclined surface 212a closer to the first inclined surface 211 and a lateral side second inclined surface 212b closer to the third inclined surface 213. As indicated by the reference sign 9002 in FIG. 10, in a cross-sectional view including the front side second inclined surface 212a, an angle formed by the front side second inclined surface 212a with respect to the front end surface 22 is referred to as a second inclination angle $\theta 21$. As indicated by the reference sign 9003 in FIG. 10, in a cross-sectional view including the lateral side second inclined surface 212b, an angle formed by the lateral side second inclined surface 212b with respect to the front end surface 22 is referred to as a second inclination angle $\theta 22$.

As indicated by a reference sign 9004 in FIG. 10, in a cross-sectional view including the third inclined surface 213, an angle formed by the third inclined surface 213 with respect to the front end surface 22 is referred to as a third inclination angle $\theta 3$. As indicated by a reference sign 9005 in FIG. 10, in a cross-sectional view including the fourth inclined surface 214, an angle formed by the fourth inclined surface 214 with respect to the front end surface 22 is referred to as a fourth inclination angle $\theta 4$.

In the cutting portion 20 in the present example, a second inclination angle (the second inclination angle $\theta 21$ or the second inclination angle θ22) of the second inclined surface 212 may be greater than the first inclination angle θ1 of the first inclined surface 211. In other words, the first inclination angle θ1 may be smaller than the second inclination angle.

Since the first cutting edge F1 includes the end portion closer to the side of the front end of the front cutting edge F, for example, during the groove processing, a large cutting load is easily applied to the first cutting edge F1. When the first inclination angle θ1 is relatively small, the thickness of the insert 1 near the first cutting edge F1 is easily ensured. That is, chipping is less likely to occur near the first cutting edge F1. This makes it possible to perform stable machining even during the groove processing, and thus the insert 1 has high versatility.

When the top surface 21 includes the breaker protrusion 21d extending along the second lateral surface 24 and rising from the bottom surface 21c toward the second lateral surface 24, the second inclination angle is relatively large, and thus the chips generated in the second cutting edge F2 easily advance toward the breaker protrusion 21d. Thus, the processing performance of the chips is improved.

The first inclined surface 211 may include a region where the inclination angle increases as the first inclined surface 211 approaches the second inclined surface 212. As a result, the first cutting edge F1 can include a portion where sharpness is improved as the first cutting edge F1 approaches the second cutting edge F2. Therefore, while the durability of the first cutting edge F1 during the groove processing or the like is ensured, the likelihood of occurrence of tearing on the machining surface in the post-grinding or the like is reduced.

The second inclined surface 212 may include the region (the front side second inclined surface 212a) where the inclination angle increases as the second inclined surface 212 approaches the first inclined surface 211. Since the first cutting edge F1 includes the end portion closer to the side of the front end of the front cutting edge F, the second cutting edge F2 approaches the end portion closer to the side of the front end of the front cutting edge F as the second cutting edge F2 approaches the first cutting edge F1. At this time, when the second inclined surface 212 includes the above-described region, the thickness of the insert 1 in the portion where the second inclined surface 212 is positioned is easily ensured to be thick as the second inclined surface 212 approaches the first inclined surface. Therefore, chipping is less likely to be generated in the second cutting edge F2. When the above-described region is connected to the first inclined surface 211, the chipping is further less likely to be generated in the second cutting edge F2.

The second inclined surface 212 may include a region (the lateral side second inclined surface 212b) where the inclination angle increases as the second inclined surface 212 approaches the third inclined surface 213. That is, the second inclination angle θ22 of the lateral side second inclined surface 212b may be greater than the second inclination angle θ21 of the front second inclined surface 212a. The radius of curvature R3 of the third cutting edge F3 is smaller than the radius of curvature R2 of the second cutting edge F2. In this case, since it is difficult to secure a large area of the third inclined surface 213 with respect to the length of the third cutting edge F3, the chips generated by the third cutting edge F3 may clog the third inclined surface 213.

However, when the second inclined surface 212 includes the above-described region (lateral side second inclined surface 212b), the chips easily flow in the lateral side second inclined surface 212b due to the second inclination angle θ22 being relatively large. Therefore, the chips generated by the third cutting edge F3 easily flow into the lateral side second inclined surface 212b. As a result, chip clogging in the third inclined surface 213 is unlikely to occur. Note that, when the above-described region (lateral side second inclined surface 212b) is connected to the third inclined surface 213, the chip clogging in the third inclined surface 213 is further less likely to occur.

4. Insert Material, etc.

Examples of a material of the insert 1 include, for example, an inorganic material such as cemented carbide alloy, cermet, and ceramics. Examples of the composition of the cemented carbide alloy include WC (tungsten carbide)-Co, WC-TiC (titanium carbide)-Co and WC-TiC-TaC (tantalum carbide)-Co.

Here, WC, TiC and TaC are hard particles, and Co is a binder phase. Cermet is a sintered composite material in which a metal is combined with a ceramic component. Specific examples of the cermet include a compound mainly composed of TiC or TiN (titanium nitride). It goes without saying that the material of the insert 1 is not limited to these materials.

In addition, although not illustrated in particular, the insert 1 may include a body containing the above-described material and a coating layer covering the body. Examples of the material of the coating layer include carbide, nitride, oxide, carbonate, nitroxide, carbonitride, and oxycarbonitride of titanium. The coating layer may contain only one of the above-described materials or a plurality of the above-described materials. The coating layer may include only one layer or a plurality of layers. Note that the material of the coating layer is not limited to these materials.

The coating layer can be positioned on a base by using a chemical vapor deposition (CVD) method or a physical vapor deposition (PVD) method. For example, in a case where the coating layer is formed by using the above-described vapor deposition method while the base is held on an inner peripheral surface of the through hole 13, the coating layer can be positioned to entirely cover a surface of the base except for the inner peripheral surface of the through hole 13.

5. Cutting Tool

Figure 11:
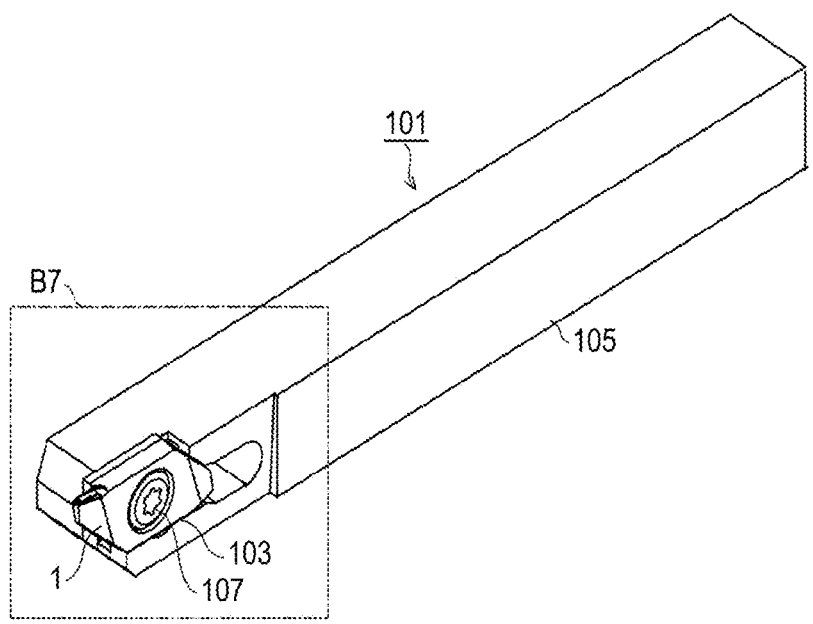
FIG. 11 is a perspective view illustrating a cutting tool of an embodiment.
Figure 12:
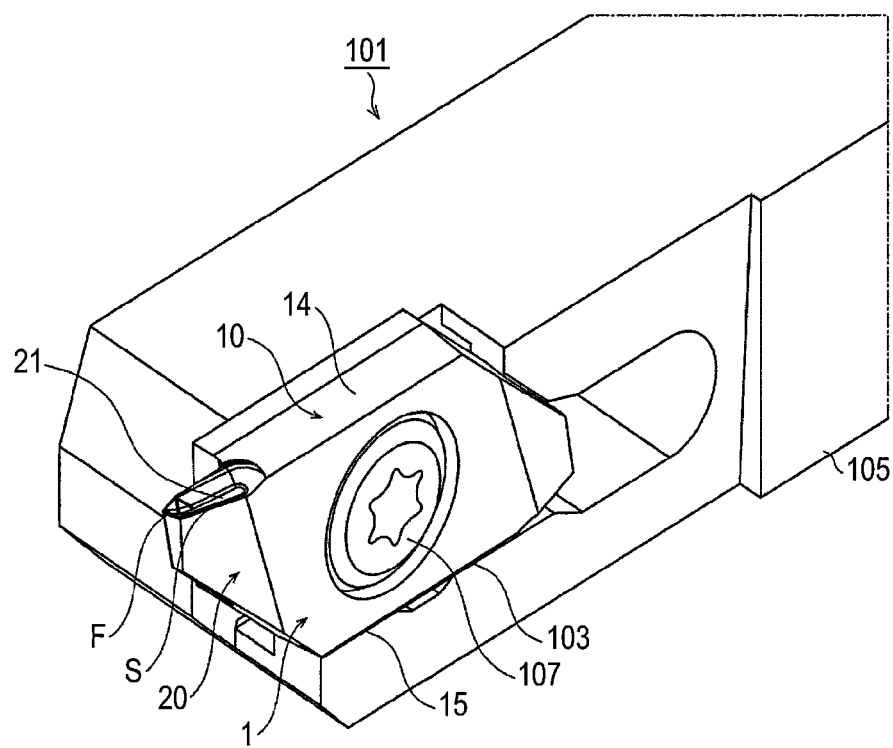
FIG. 12 is an enlarged view of a region B7 illustrated in FIG. 11.

A cutting tool 101 according to an embodiment will be described with reference to the drawings by using FIGS. 11 and 12. FIG. 11 is a perspective view illustrating the cutting tool 101 according to an embodiment. FIG. 12 is an enlarged view of a region B7 illustrated in FIG. 11.

As illustrated in FIG. 11, the cutting tool 101 of the embodiment is a tool of a rod-shaped body including the insert 1 closer to the side of the front end thereof. The cutting tool 101 includes the holder 105 of the rod shape body. The holder 105 includes a pocket 103 closer to the side of the front end thereof. The insert 1 is positioned in the pocket 103.

As illustrated in FIG. 12, the pocket 103 is a portion to which the insert 1 is mounted and includes a seating face and a binding side surface, which is inclined with respect to the seating face. In addition, the pocket 103 is open on the side of the front end of the holder 105.

The insert 1 is mounted such that a portion used as a cutting edge of the cutting portion 20, that is, at least a part of the above-described front cutting edge F or the lateral cutting edge S projects outward from the holder 105. In the present example, when the insert 1 is attached to the holder 105, the top side surface 14 of the base portion 10 is an upper end of the insert 1, and the bottom side surface 15 of the base portion 10 is a lower end of the insert 1. In the present example, the insert 1 is mounted on the holder 105 by a screw 107.

In a state in which the insert 1 is mounted in the pocket 103, the base portion 10 of the insert 1 may be in direct contact with the pocket 103, or a sheet may be interposed between the insert 1 and the pocket 103.

As a material of the holder 105, steel, cast iron, or the like is used. In particular, among these materials, when steel is used, the toughness of the holder 105 can be increased.

Such a cutting tool 101 can be used in so-called turning processing and can be used in post-grinding. However, the present example is not limited to post-grinding, and the cutting tool 101 can also be used for, for example, boring, outer diameter processing, and groove-forming.

6. Method for Manufacturing Machined Product

Description will be given of a method for manufacturing a machined product according to an embodiment by using FIGS. 13 to 16. FIGS. 13 to 16 are schematic views illustrating one step of the method for manufacturing the machined product according to the embodiment. FIGS. 13 to 16 illustrate states in which the cutting tool 101 on which the insert 1 is mounted is viewed from the side of the top surface 21 of the cutting portion 20.

A machined product is manufactured by machining a workpiece 201. The method for manufacturing a machined product according to the embodiment includes the following steps. That is, the present embodiment includes:

(1) Rotating the workpiece 201,
(2) Bringing the cutting tool 101 into contact with the workpiece 201 that is rotating, and
(3) Separating the cutting tool 101 from the workpiece 201.

Figure 13:
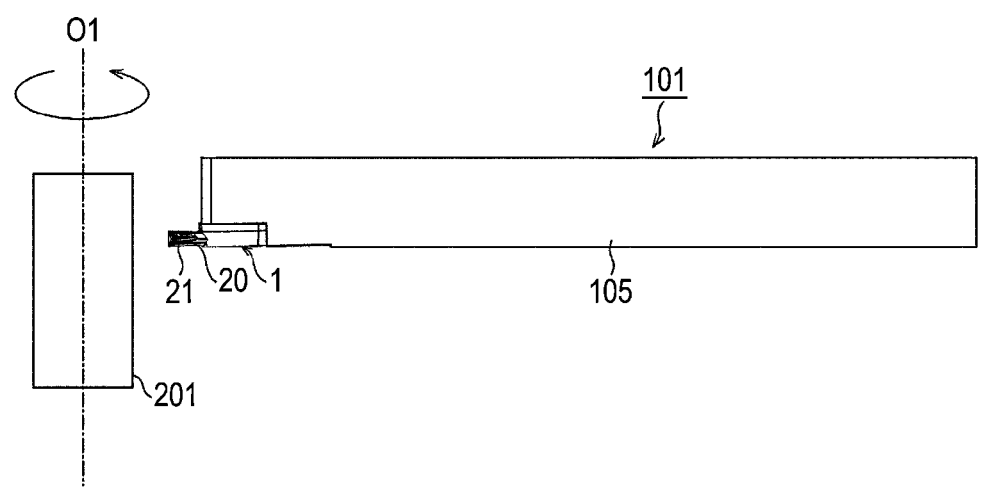
FIG. 13 is a schematic view illustrating one step of a method for manufacturing a machined product of an embodiment.
Figure 14:
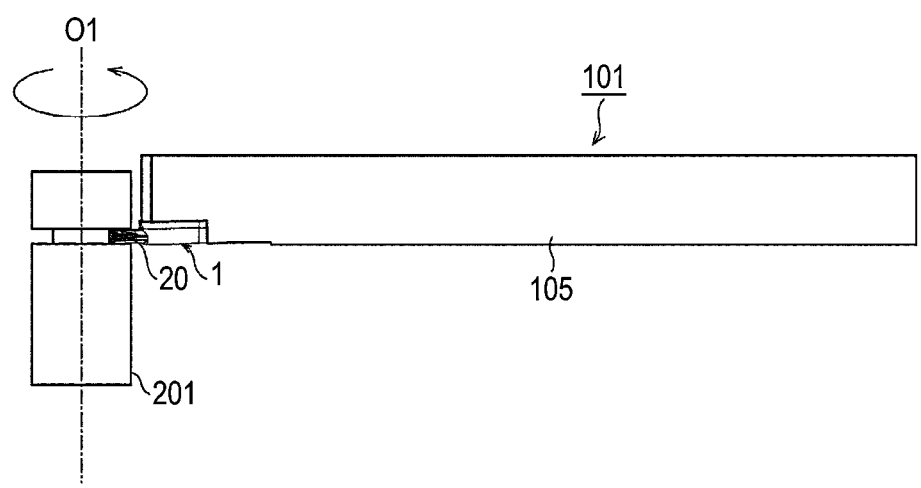
FIG. 14 is a schematic view illustrating one step of the method for manufacturing the machined product of the embodiment.
Figure 15:
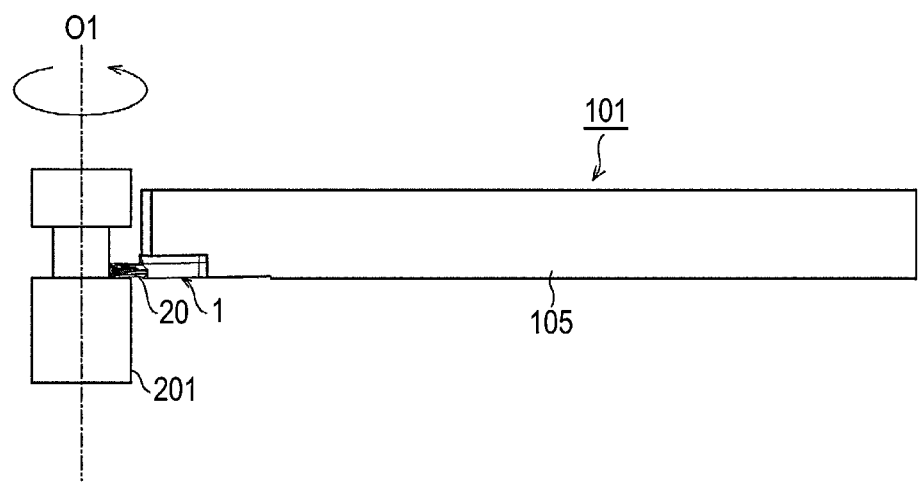
FIG. 15 is a schematic view illustrating one step of the method for manufacturing the machined product of the embodiment.
Figure 16:
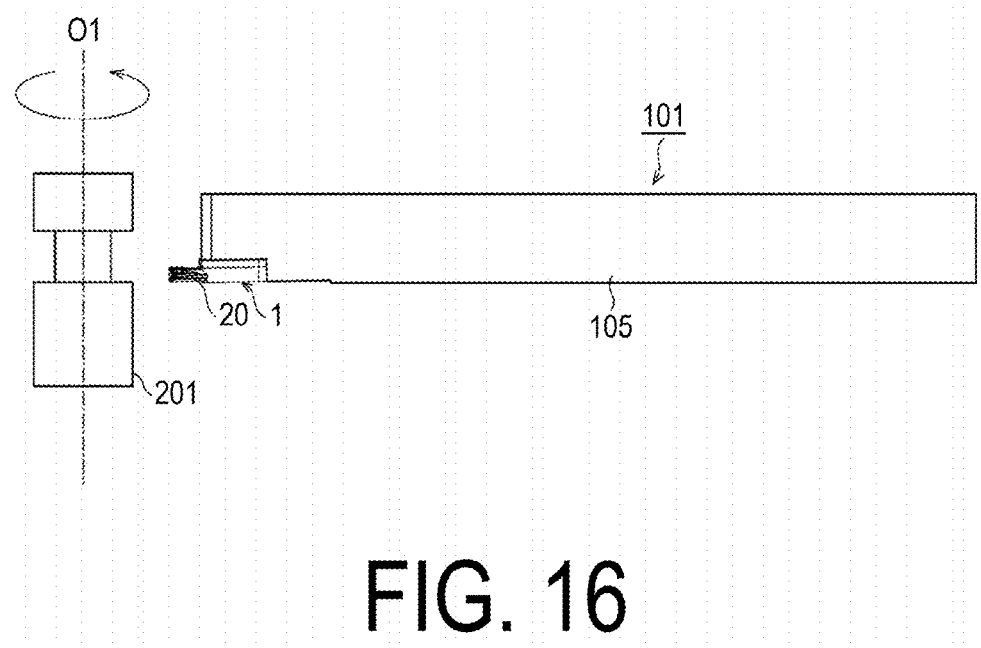
FIG. 16 is a schematic view illustrating one step of the method for manufacturing the machined product of the embodiment.

More specifically, first, as illustrated in FIG. 13, the workpiece 201 is rotated about an axis O1, and the cutting tool 101 is brought relatively close to the workpiece 201. As illustrated in FIG. 14, the front cutting edge F and the lateral cutting edge S serving as the cutting edges of the cutting tool 101 are brought into contact with the workpiece 201, and the workpiece 201 is cut. As illustrated in FIG. 15, in a state where the cutting edges of the cutting tool 101 are brought into contact with the workpiece 201, the cutting tool 101 is moved relative to the workpiece 201 that is rotating in an axial direction of an axis O1, and the workpiece 201 is cut. At this time, the lateral cutting edge S faces forward in the movement direction. As illustrated in FIG. 16, the cutting tool 101 is relatively moved away from the workpiece 201.

In the examples in FIGS. 13 and 14, the cutting tool 101 is moved while the axis O1 is fixed and the workpiece 201 is rotated around the axis O1, and accordingly the cutting tool 101 is brought close to the workpiece 201. In the examples in FIGS. 14 and 15, the workpiece 201 is cut by bringing the cutting edge of the insert 1 into contact with the workpiece 201 that is rotating. In FIG. 16, the cutting tool 101 is moved while the workpiece 201 is rotated, and accordingly the cutting tool 101 is moved away from the workpiece 201.

Note that in the machining in the method for manufacturing according to the embodiment, the cutting tool 101 is brought into contact with the workpiece 201 or the cutting tool 101 is moved away from the workpiece 201, by moving the cutting tool 101 in each step. However, naturally, the present invention is not limited to such a configuration.

For example, in step (1), the workpiece 201 may be brought close to the cutting tool 101. In step (3), the workpiece 201 may be moved away from the cutting tool 101. To continue the machining process, a step of bringing the cutting edge of the insert 1 into contact with different locations of the workpiece 201 while the workpiece 201 is kept rotating may be repeated.

Note that typical examples of a material of the workpiece 201 include carbon steel, alloy steel, stainless steel, cast iron, and non-ferrous metal.

As described above, a cutting insert according to an aspect of the present disclosure includes a base portion and a cutting portion provided to project from the base portion, wherein the cutting portion includes a front end surface positioned closer to a side of a front end in a direction projecting from the base portion, an top surface extending from the base portion to the front end surface, a first lateral surface extending from the base portion to the front end surface and adjacent to the top surface, a second lateral surface extending from the base portion to the front end surface and adjacent to the top surface on the opposite side of the first lateral surface, a front cutting edge positioned at an intersection of the top surface and the front end surface, and a lateral cutting edge positioned at an intersection of the top surface and the first lateral surface. The front cutting edge includes a first cutting edge including an end portion closer to the side of the front end of the front cutting edge and a second cutting edge positioned between the first cutting edge and the lateral cutting edge, and a radius of curvature of the first cutting edge is greater than a radius of curvature of the second cutting edge.

In some cases, high-precision cutting in which the surface roughness of the machining surface is further reduced may further be required. An object of an aspect of the present disclosure is to provide a cutting insert capable of further reducing the surface roughness of the machining surface.

An aspect of the present disclosure makes it easier to avoid excessive thinning of the thickness of chips. Therefore, tearing is less likely to occur on the machining surface of the workpiece. As a result, the surface roughness of the machining surface can be further reduced.

SUPPLEMENTARY NOTE

The invention according to the present disclosure has been described above based on the drawings and examples. However, the invention according to the present disclosure is not limited to each embodiment described above. That is, the invention according to the present disclosure can be varied in various ways within the scope indicated in the present disclosure, and an embodiment to be obtained by appropriately combining technical means disclosed in different embodiments is also included in the technical scope of the invention according to the present disclosure. In other words, note that a person skilled in the art can easily make various changes or variations based on the present disclosure. Note that these changes or variations are included within the scope of the present disclosure.

The invention claimed is:

1. A cutting insert comprising:
a base portion; and
a cutting portion provided to project from the base portion, wherein
the cutting portion comprises
a front end surface positioned closer to a side of a front end in a direction projecting from the base portion,
a top surface extending from the base portion to the front end surface,
a first lateral surface extending from the base portion to the front end surface and adjacent to the top surface,
a second lateral surface extending from the base portion to the front end surface and adjacent to the top surface on the opposite side of the first lateral surface, a front cutting edge positioned at an intersection of the top surface and the front end surface, and a lateral cutting edge positioned at an intersection of the top surface and the first lateral surface, the front cutting edge comprises a first cutting edge comprising an end portion closer to the front end of the front cutting edge, and a second cutting edge positioned between the first cutting edge and the lateral cutting edge, a radius of curvature of the first cutting edge is greater than a radius of curvature of the second cutting edge, the top surface comprises a front inclined surface positioned along the front cutting edge and inclined downward as the front inclined surface becomes further away from the front cutting edge, the front inclined surface comprises a first inclined surface positioned along the first cutting edge, and a second inclined surface positioned along the second cutting edge, and a second inclination angle of the second inclined surface is larger than a first inclination angle of the first inclined surface.

2. The cutting insert according to claim 1, wherein the second inclined surface comprises a region where an inclination angle increases as the second inclined surface approaches the first inclined surface.

3. The cutting insert according to claim 1, wherein the front cutting edge further comprises a third cutting edge positioned between the second cutting edge and the lateral cutting edge, and a radius of curvature of the third cutting edge is smaller than the radius of curvature of the second cutting edge.

4. The cutting insert according to claim 3, wherein the front inclined surface further comprises a third inclined surface positioned along the third cutting edge, and the second inclined surface includes a region where the inclination angle increases as the second inclined surface approaches the third inclined surface.

5. The cutting insert according to claim 1, wherein the front cutting edge further comprises a fourth cutting edge extending from the first cutting edge toward the second lateral surface, and the radius of curvature of the first cutting edge is greater than a radius of curvature of the fourth cutting edge.

6. The cutting insert according to claim 5, wherein the radius of curvature of the second cutting edge is greater than the radius of curvature of the fourth cutting edge.

7. The cutting insert according to claim 1, wherein the second cutting edge is longer than the first cutting edge.

8. A cutting tool comprising:

a holder including a pocket positioned on the side of the front end; and the cutting insert according to claim 1 positioned in the pocket.

9. A method for manufacturing a machined product, the method comprising:

rotating a workpiece;

bringing the cutting tool according to claim 8 into contact with the workpiece that is rotating; and separating the cutting tool from the workpiece.

10. A cutting insert comprising:

a base portion; and a cutting portion provided to project from the base portion, wherein the cutting portion comprises a front end surface positioned closer to a side of a front end in a direction projecting from the base portion, a top surface extending from the base portion to the front end surface, a first lateral surface extending from the base portion to the front end surface and adjacent to the top surface, a second lateral surface extending from the base portion to the front end surface and adjacent to the top surface on the opposite side of the first lateral surface, a front cutting edge positioned at an intersection of the top surface and the front end surface, and a lateral cutting edge positioned at an intersection of the top surface and the first lateral surface, the front cutting edge comprises a first cutting edge comprising an end portion closer to the front end of the front cutting edge, and a second cutting edge positioned between the first cutting edge and the lateral cutting edge, the top surface comprises a front inclined surface positioned along the front cutting edge and inclined downward as the front inclined surface becomes further away from the front cutting edge, the front inclined surface comprises a first inclined surface positioned along the first cutting edge and a second inclined surface positioned along the second cutting edge, and a second inclination angle of the second inclined surface is larger than a first inclination angle of the first inclined surface.

11. A cutting insert comprising:

a base portion; and a cutting portion provided to project from the base portion, wherein the cutting portion comprises a front end surface positioned closer to a side of a front end in a direction in which the cutting portion projects from the base portion, a top surface extending from the base portion to the front end surface, a first lateral surface extending from the base portion to the front end surface and adjacent to the top surface, a second lateral surface extending from the base portion to the front end surface and adjacent to the top surface on the opposite side of the first lateral surface, a front cutting edge positioned at an intersection of the top surface and the front end surface, and a lateral cutting edge positioned at an intersection of the top surface and the first lateral surface, the front cutting edge comprises a first cutting edge located at an end portion farthest from the base portion in the direction in which the cutting portion projects from the base portion, a second cutting edge positioned between the first cutting edge and the lateral cutting edge, and a third cutting edge extending from the first cutting edge toward the second lateral surface, a radius of curvature of the first cutting edge is greater than a radius of curvature of the second cutting edge, and the radius of curvature of the second cutting edge is greater than a radius of curvature of the third cutting edge.

* * * * *